UNITED STATES PATENT OFFICE.

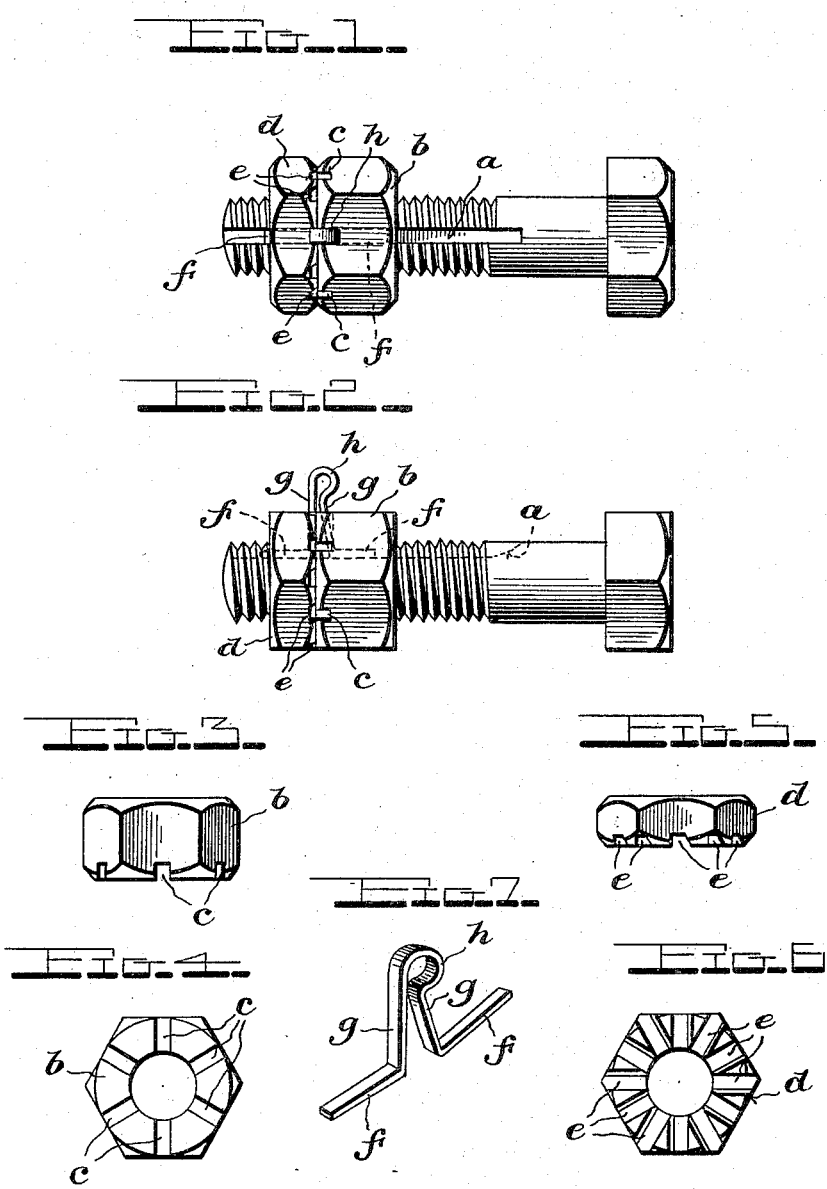

HARRY ROBINSON, OF SHEFFIELD, ALABAMA, ASSIGNOR OF ONE-HALF TO C. E. BUEK, OF CHATTANOOGA, TENNESSEE.

NUT-LOCK.

1,168,555.  Specification of Letters Patent.  Patented Jan. 18, 1916.

Application filed April 17, 1915. Serial No. 22,117.

*To all whom it may concern:*

Be it known that I, HARRY ROBINSON, a citizen of the United States of America, and a resident of Sheffield, county of Colbert, State of Alabama, have invented certain new and useful Improvements in Nut-Locks, of which the following is a full and clear specification, reference being had to the accompanying drawings, in which—

Figure 1 is a side elevation of a bolt provided with my improved device: Fig. 2 is a side elevation of the same looking at it from a point at right angles to Fig. 1; and Figs. 3, 4, 5, 6 and 7 are detail views fully explained in the detail description herein given.

The object of this invention is to provide simple means for removably locking a nut in its tightened position on a bolt, and the invention consists of certain novel features hereinafter described and claimed.

The bolt is provided with longitudinal external grooves *a* cutting through the threads of the bolt and the nut *b* is provided in its outer face with a series of radial grooves *c* extending from the bolt hole to the outer edge of the nut. A supplemental nut *d* is employed which is adapted to be screwed on to the bolt in the same manner as the main nut *b* and be jammed into close contact with the outer face thereof. The inner face of the supplemental nut is provided with a series of radial grooves *e* any one of which is adapted to be brought into alinement or registration with any one of the grooves *c* in the main nut, and the grooves in each nut are adapted to be brought into alinement with the grooves *a* in the bolt. To lock the two ends together and to the bolt, I employ a spring key preferably constructed of a single strip or bar of steel bent into shape. This key consists of a pair of pins *f* projecting in opposite directions from the respective limbs *g* of a spring-eye or loop *h*, the spring *h* serving to normally spread the limbs *g*. After the main nut is screwed home, the pins *f* are inserted in the groove *a* and one of the limbs *g* is placed in the alining groove *c* of the main nut; then the two limbs *g* are pressed closely together and into said groove *c* and held therein while the lock nut *d* is screwed up hard against the main nut, whereupon the limbs *g* may be released and allowed to spring apart. When the limbs *g* are thus permitted to expand, the outer one will lodge in an alining groove *e* of the lock nut *b* and thus the two nuts will be locked together and also to the bolt. In applying the device, the only care needed is that one of the grooves *c* of the main nut shall be brought into alinement with the groove *a* of the bolt and that one of the grooves in the lock nut shall be brought into alinement with the outer member *f* of the key. When it is desired to unlock the main nut, it is simply necessary to press the two members *g* of the key into the groove *c* far enough to disengage the lock nut, whereupon the lock nut is free to be turned. The two members *g* may be thus pressed together into the groove *c* by simply pinching the projecting loop with the fingers or a tool, or by pressing the outer member *g* back by the jaw of a wrench, or by inserting a tool in the groove *a* and forcing it against the end of the outer one of the bars *f*, said groove being open clear to the end of the bolt and thus permitting this latter manner of unlocking the parts to be readily resorted to. It will be observed that it is essential that each of the grooves *c* shall be deep enough to receive both members *g* of the key as otherwise it would be impossible to disengage the lock nut when it is desired to unlock the main nut.

It will be observed also that it is important that the connected ends of the spring members *g* shall project a sufficient distance beyond the sides of the nuts to enable a tool to be applied thereto for the purpose of pressing these members together and into the groove *c* until the lock nut is unscrewed a sufficient distance from the main nut to be out of the reach of the outer member *g* when the two members expand to their normal extent.

It will be observed that the rear wall or edge of each of the grooves *e* is beveled off, at *e'*, so that in screwing up the lock nut the grooves will act in the manner of a ratchet, the beveled parts *e'* serving as cams to press the outer spring member *g* toward its companion inner member as the raised parts between the grooves pass said outer member *g*, said member *g* springing back into each of the grooves *e* when it registers with said member *g*. In this manner, I avoid the necessity of holding the said outer member *g* pressed into the groove *c* of the main nut during the final turns of the lock nut.

Having thus described my invention, what I claim is:

1. In combination, a threaded bolt provided with a longitudinal groove, a main nut provided with a series of grooves in its outer face, a lock nut provided with a similar series of grooves in its inner face, and a locking key having a pin or pins adapted to lie in the groove in the bolt and also a pair of radial members normally tending to spring apart and adapted respectively to engage the grooves in the adjacent faces of the two nuts, for the purpose set forth, the outer ends of the radial members being connected together by a spring member and extended beyond the sides of the nuts and said groove in the main nut being deep enough to receive both of said members when they are pressed together.

2. In combination, a threaded bolt provided with a longitudinal groove, a main nut provided with a series of grooves in its outer face, a lock nut provided with a similar series of grooves in its innner face, each of said grooves having its rear wall beveled off, and a locking key having a pin or pins adapted to lie in the groove in the bolt and also a pair of radial members normally tending to spring apart and adapted respectively to engage the grooves in the adjacent faces of the two nuts, for the purpose set forth, the outer ends of the radial members being connected together by a spring member and extended beyond the sides of the nuts and said groove in the main nut being deep enough to receive both of said members when they are pressed together.

3. In combination, a threaded bolt provided with a longitudinal groove extending through its threaded portion, a main nut provided with a series of radial grooves in its outer face, a lock nut provided with a series of grooves in its inner face, and a locking key consisting of a pair of radial members $g$ connected together at their outer ends by a spring normally tending to spread said members apart, each of said members $g$ being provided at its inner end with a pin or bar $f$ adapted to lie in the aforesaid groove in the bolt.

In testimony whereof I hereunto affix my signature.

HARRY ROBINSON.

Witnesses:
A. B. KELLEY,
A. S. LAIDLEY.